United States Patent [19]

Corrigan

[11] 4,201,757

[45] May 6, 1980

[54] LARGE BORON NITRIDE ABRASIVE PARTICLES

[75] Inventor: Francis R. Corrigan, Westerville, Ohio

[73] Assignee: General Electric Company, Worthington, Ohio

[21] Appl. No.: 942,661

[22] Filed: Sep. 15, 1978

Related U.S. Application Data

[60] Continuation of Ser. No. 825,493, Aug. 18, 1977, abandoned, which is a division of Ser. No. 760, 853, Jan. 21, 1977, which is a continuation of Ser. No. 394,632, Sep. 6, 1973, abandoned.

[51] Int. Cl.$^2$ .............................................. C01B 35/08
[52] U.S. Cl. ...................................... 423/290; 51/307; 51/309; 264/84
[58] Field of Search .......................... 423/290; 264/84; 51/307, 309

[56] References Cited

U.S. PATENT DOCUMENTS

| | | | |
|---|---|---|---|
| 2,947,617 | 8/1960 | Wentorf | 51/307 X |
| 3,578,403 | 5/1971 | Moore | 423/290 |
| 3,851,027 | 11/1974 | Balchan et al. | 264/84 |
| 3,918,219 | 11/1975 | Wentorf et al. | 423/290 X |

FOREIGN PATENT DOCUMENTS

| | | | |
|---|---|---|---|
| 2235240 | 2/1973 | Fed. Rep. of Germany | 423/290 |
| 2083234 | 12/1971 | France | 423/290 |
| 1294284 | 10/1972 | United Kingdom . | |

OTHER PUBLICATIONS

DeCarli, P. S., "Bull. Am. Phys. Soc." II, 12, 1967, 1127.
Dulin, I. N. et al., "Solid State Physics" II, 1969, 1252.
Johnson et al., "Physical Review Letters", vol. 29, No. 20, Nov. 1972, pp. 1369-1371.
"Physics Today", Feb. 1973, pp. 17-18.

*Primary Examiner*—G. O. Peters
*Attorney, Agent, or Firm*—Morgan, Finnegan, Pine, Foley & Lee

[57] ABSTRACT

Hard boron nitride particles of wurtzite and zincblende crystal structure of larger than 50 microns particle size are formed by subjecting recrystallized pyrolytic boron nitride to dynamic shock treatment to create pressures and temperatures in which the stable form of boron nitride has a wurtzite or zincblende crystal structure.

8 Claims, 4 Drawing Figures

U.S. Patent  May 6, 1980  Sheet 3 of 3  4,201,757
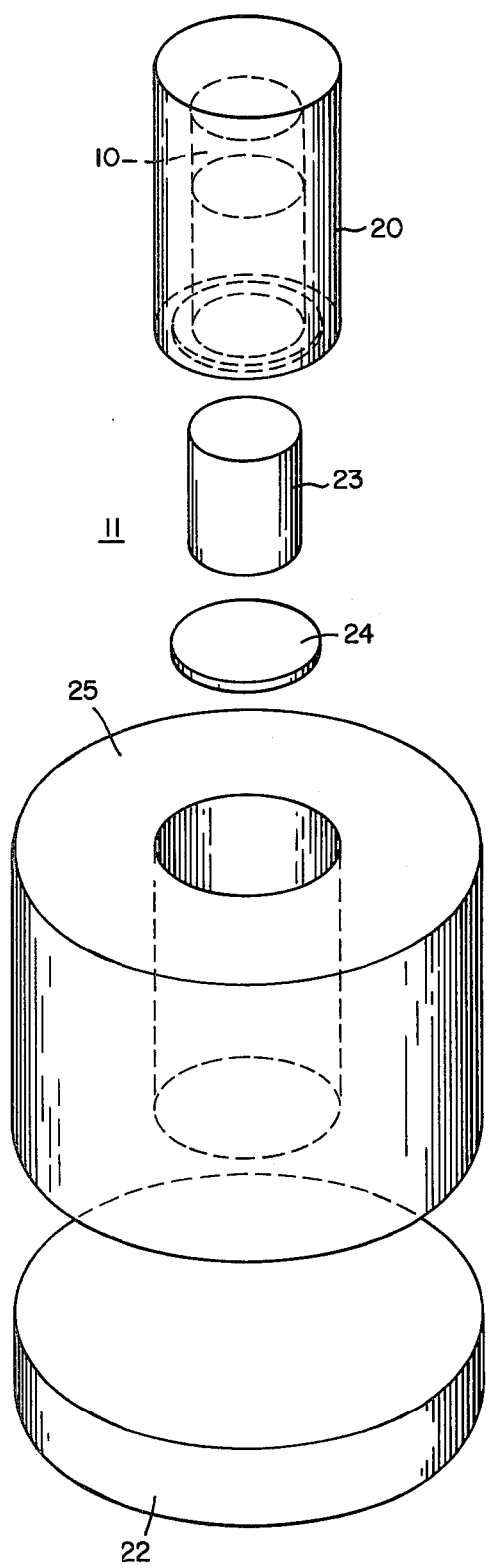
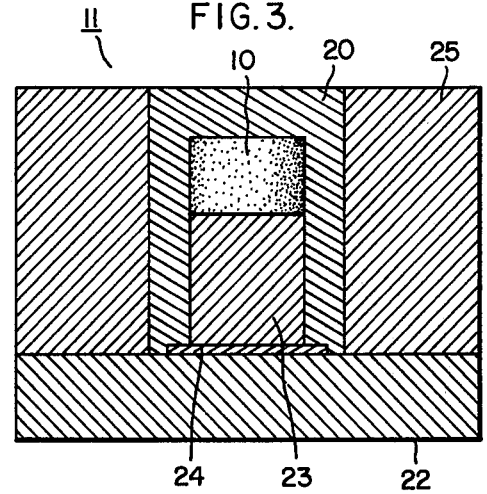

LARGE BORON NITRIDE ABRASIVE PARTICLES

This application is a continuation of application Ser. No. 825,493, filed Aug. 18, 1977, now abandoned which is a divisional application of application Ser. No. 760,853, filed Jan. 21, 1977. Application Ser. No. 760,853 is, in turn, a continuation of application Ser. No. 394,632, filed Sept. 6, 1973, now abandoned.

BACKGROUND OF THE INVENTION

This invention relates to large-size abrasive boron nitride particles produced by a shock wave process.

Boron nitride is similar to carbon in many respects. Both materials have a soft hexagonal crystal form possessing lubricating qualities. Both can be converted under high pressure conditions to two extremely hard forms—a hexagonal crystal form having a wurtzite crystalline structure and a cubic form having a zincblende crystalline structure. The soft form of boron nitride has a specific gravity of about 2.28 while both of the hard forms have a specific gravity of about 3.45. The soft form will sometimes be referred to hereinafter as "low-density boron nitride" and the hard forms as "high-density boron nitride". The high-density hexagonal form will sometimes be referred to as "wurtzite boron nitride" and the cubic high-density form will sometimes be referred to as "zincblende boron nitride".

The preparation of zincblende boron nitride was disclosed and claimed in Wentorf U.S. Pat. No. 2,947,617 which disclosed a catalytic process for making the material. Later, Bundy and Wentorf described and claimed wurtzite boron nitride in U.S. Pat. No. 3,212,851 which disclosed a direct transformation process for making the material.

It has been known that low-density boron nitride can be converted to high-density boron nitride by a shock wave process. Example 7 of British Pat. No. 1,281,002 describes the production of high-density boron nitride by means of a shock wave created by the detonation of an explosive charge.

Pyrolytic low-density boron nitride was described in Basche U.S. Pat. No. 3,152,006 which disclosed the preparation of such material by contacting a substrate with the commingled vapors of ammonia and boron trichloride on a graphite substrate at a temperature of about 1900° C. Later, Moore U.S. Pat. No. 3,578,403 described the recrystallization of pyrolytic boron nitride to produce a highly crystalline transparent material. In this process the pyrolytic boron nitride was subjected to a temperature above 2250° C. under a pressure of between 5000 psi and 15,000 psi applied in a direction perpendicular to the basal planes of the pyrolytic material.

The static processes of U.S. Pat. Nos. 2,947,617 and 3,212,851 enable the high-density boron nitride to be formed over a period of a number of seconds or even minutes. As a result the high-density crystals are relatively large. For example, column 11, line 39, of U.S. Pat. No. 2,947,617 reports crystals having an average diameter of 200 to 400 microns. Contrasted with this, shock wave processes effect the transformation of low-density boron nitride to high-density boron nitride in a period of about a microsecond. Particle sizes reported from shock wave processes have been 10 microns diameter or less. This small size has greatly limited the commercial use of shock wave techniques for producing high-density boron nitride.

SUMMARY OF THE INVENTION

The present invention provides a way to produce high-density boron nitride particles which are larger than 50 microns in diameter and generally are several hundred microns in diameter. This is achieved by subjecting recrystallized pyrolytic boron nitride such as that disclosed in U.S. Pat. No. 3,578,403 to dynamic shock wave treatment which creates pressure and temperature conditions in which the stable form of boron nitride is high-density boron nitride. Most of the high-density boron nitride thus formed is wurtzite boron nitride.

DESCRIPTION OF THE DRAWINGS

FIG. 3 is an enlarged sectional view of a specimen holder used in FIG. 2.

FIG. 4 is an exploded view of the specimen holder of FIG. 3.

DESCRIPTION OF THE PREFERRED EMBODIMENT

Figure 1:
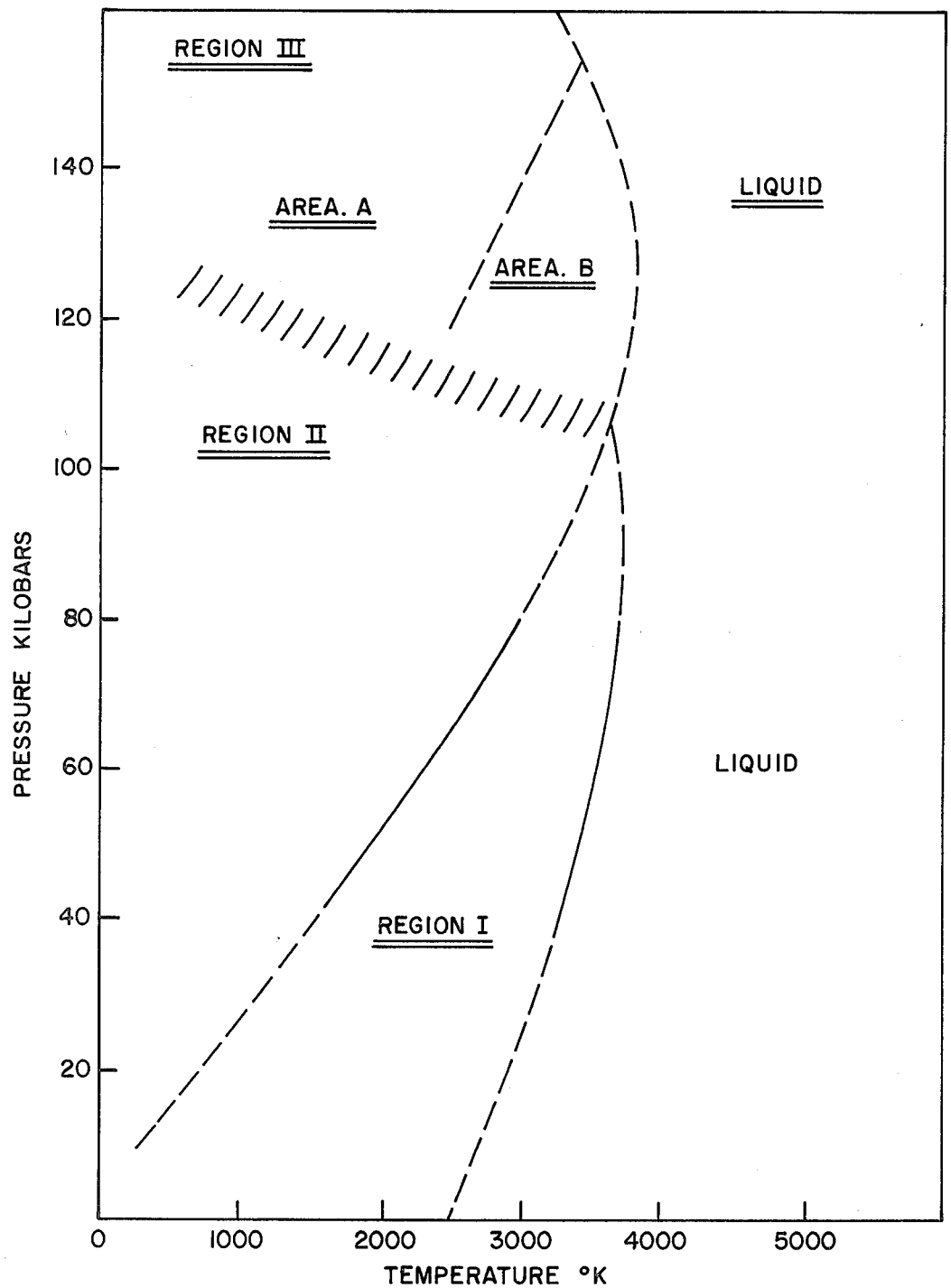
FIG. 1 is a boron nitride phase diagram showing the pressure and temperature conditions under which low-density and high-density boron nitride is stable or metastable.

In FIG. 1 the boron nitride phase diagram in the pressure-temperature plane is marked into three regions outside of the liquid phase. In region I low-density boron nitride is stable and both wurtzite and zinc-blende boron nitride are metastable. In region II wurtzite and zincblende boron nitride are stable and low-density boron nitride is metastable. Region III is divided into Area A and area B. In area A the pressure and temperature conditions will promote the formation of wurtzite boron nitride. In area B, these conditions will promote the formation of zincblende boron nitride. The boundary between region II and region III is shown as an area because the precise point at which conversion takes place has not been determined for line accuracy. Likewise the dividing line between area A and area B is shown dashed because its position is not known accurately.

In the shock conversion of low-density boron nitride to high-density boron nitride the low-density material is subjected to a shock wave of sufficient amplitude to shock-compress the material into the direct conversion region III of FIG. 1. In the shock conversion process the high pressure applied is transient in nature, the duration being generally of the order of a microsecond. Because of the extremely short duration of the shock wave pressure pulse, there will be insufficient time for diffusion rate controlled chemical reaction mechanisms to be effective in the shock transformation process. However, there is ample time for diffusionless transition to occur under shock pressure conditions. A simple C-axis compression is probably the mechanism for transformation of low-density boron nitride to high-density.

The basic structural element of low-density boron nitride is a flat hexagon, the vertices of which are occupied alternately by boron and nitrogen atoms. The hexagon units are fused into layers which are stacked vertically (C-direction) above one another in such a manner that the boron and nitrogen atoms also alternate from layer to layer in the C-direction. Weak ionic bonding exists between the layers compared to the strong predominantly covalent bonding between the atoms within the layers. The high-density boron nitride structures can be viewed as fused hexagon layered structures. The hexagon units are, however, no longer flat, but puckered out of plane. Predominantly covalent bonding exists between atoms of adjacent layers.

If the low-pressure structure is compressed in the C-direction, the compressed array of boron and nitrogen atoms becomes spatially similar to the high pressure structures, except for an additional out-of-plane movement of the atoms from the layers. Transformation to wurtzite boron nitride believed to occur by way of out-of-plane atom displacement parallel to the C-axis and transformation to the zincblende boron nitride structure by way of somewhat longer displacement in directions non-parallel to the C-axis. In both cases the low-pressure trigonal bonds are broken and dense-phase tetrahedral bonds are formed. The particular high-density boron nitride structure into which the boron and nitrogen atoms condense will be dependent on which high-density form is thermodynamically preferred at the temperature existing during the transformation. Thus, the transformation can be considered a two-step process in which the shock wave compresses the layers to bring the atoms of adjacent layers into such proximity that the electrostatic interactions between the layer atoms becomes sufficiently strong to cause electronic orbital rearrangement and snap the atoms into either wurtzite boron nitride or zincblende boron nitride.

In carrying out the process of this invention, recrystallized pyrolytic boron nitride is subjected to a shock wave of sufficient intensity to bring about pressure-temperature conditions in region III of FIG. 1. The shock wave may be introduced to the pyrolytic material by various known shock-generating techniques. For example, the exterior surface of a suitable container may be impacted with a high velocity explosively driven projectile or an exterior container surface may be impacted with a detonation wave. A detonation wave is the pressure wave produced by a detonating explosive. Various geometric configurations may be used to obtain converging or intersecting shock waves.

Figure 2:
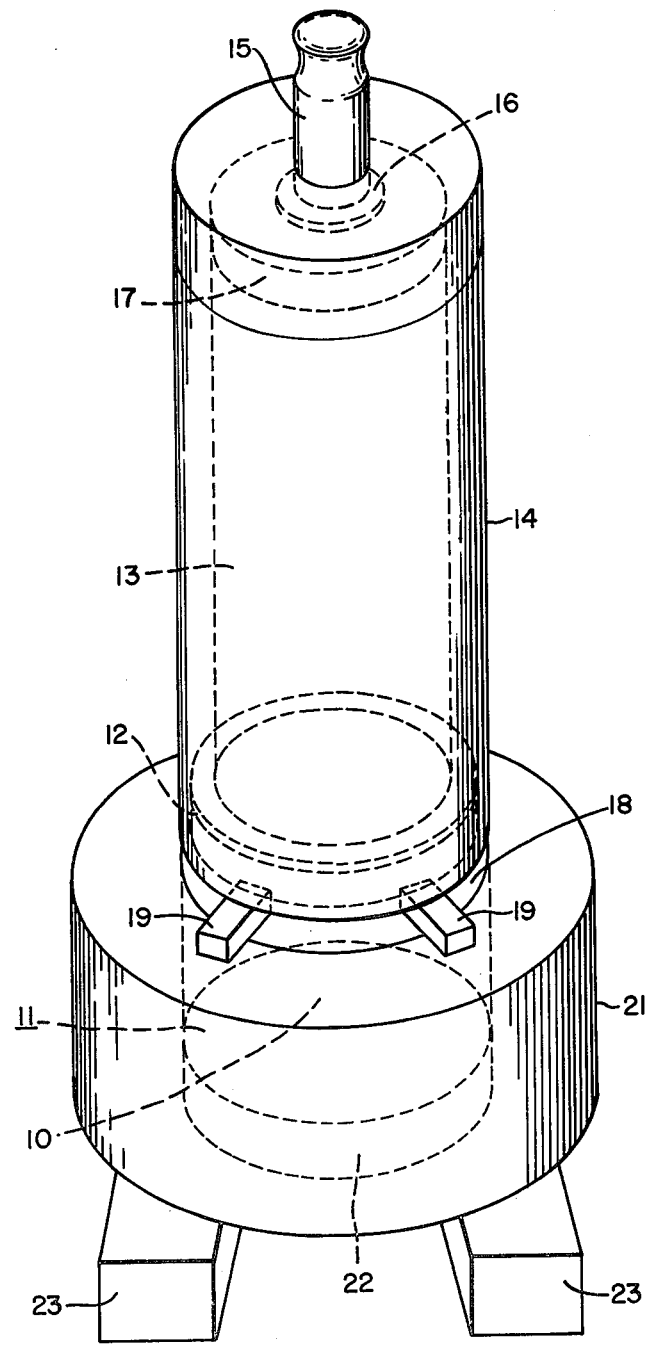
FIG. 2 is a perspective view of a shock wave apparatus.

FIG. 2 shows one type of apparatus in which the invention is carried out. In this apparatus a shock wave is introduced into a sample 10 positioned in a sample holder assembly 11 by impacting the top surface of the assembly 11 with a flyer plate 12 driven by a high-explosive driving charge 13 positioned in a copper tube 14. The high-explosive charge 13 is fired by means of an electrically controlled blasting cap 15 which initiates a sensitive sheet explosive 16 which in turn fires a booster charge 17 which in turn fires the driving charge 13. Detonation of the charge 13 accelerates the flyer plate 12 which impacts the front surface of the sample holder assembly 11 resulting in a shock wave being introduced into the sample container front wall, which then propagates through the container wall into the boron nitride sample 10. An air gap 18 is provided between the explosive portion of the assembly and the sample holder 11 by three aluminum standoffs 19. The sample holder assembly 11 is surrounded by a lead member 21 which aids in container retention and sample retrieval. The side of the sample holder assembly 11 away from the explosive charge is backed with a cylindrical momentum trap 22. For convenience the entire assembly illustrated in FIG. 2 may be placed on wooden blocks 23 which serve as a stand.

Typical dimensions for an assembly such as is illustrated in FIG. 2 would have a booster charge 17 of about 0.75 inch thickness, a driving charge 13 of about 5.375 inches thickness, an air gap 18 of about one-quarter inch, a sample holder assembly 11 of 2 to 2.5 inches long and 2.5 to 3.5 inches in diameter, a steel flyer 12 one-sixteenth to one-half inch thick and 2.5 to 3.5 inches in diameter, a lead doughnut-shaped surround 21 of about two inches wall thickness, and a one-half inch thick momentum trap 22.

FIG. 3 is a cross-section through the sample holder assembly 11 and momentum trap 22 of FIG. 2. FIG. 4 is an expanded view of the assembly of FIG. 3. In FIGS. 3 and 4 the sample 10 of low-density boron nitride is placed in a container 20 near the surface to be impacted by the flyer plate 12. A piston 23, which is grooved to allow evacuation of the chamber occupied by the boron nitride, is inserted in the container 20. The chamber of the container 20 is then evacuated and sealed under vacuum by welding a weld cap 24 into sealing engagement. The container 20 is then inserted into a chamber formed by a steel surround 25 and the momentum trap 22 is positioned in contact with, but not attached to, the surfaces of the weld cap 24 and protective surround 25 which are farthest removed from the explosive charge 13. The purpose of the momentum trap 22 is to trap the shock wave and prevent damaging tensile waves from being reflected back into the sample chamber. All samples container parts are made of standard stock steel.

The pressure level and pressure duration attained by the firing of explosive charge 18 can be controlled by varying the quantity and geometry of the charge and the thickness and impedence of the flyer plate to produce pressures above 100 kilobars, and even above 500 kilobars. Typical pressures of the invention are about 475 kilobars in the steel container. Under such conditions, almost 100% of the low-density boron nitride is converted to high-density boron nitride. The high-density boron nitride is mostly wurtzite boron nitride but there may also be zincblende boron nitride in the mixture.

Parameters which must be considered in providing high-density boron nitride having optimum properties include the weight and velocity of the flyer 12 and the thickness of the low-density boron nitride sample. High pressures promote the formation of larger-sized particles. Flyer velocities of about 7000 feet per second will produce particles as large as 1 millimeter in longest dimension.

While the invention has been described with reference to a specific embodiment, it is obvious that there may be many variations which fall properly within the scope of the invention. Therefore, the invention should be limited in scope only as may be necessitated by the scope of the appended claims.

What I claim as new and desire to secure by Letters Patents of the United States is:

1. Wurtzite boron nitride particles having a particle size of at least 50 microns, said particles being obtained by compression of recrystallized pyrolytic boron nitride along the C-axis.

2. Wurtzite boron nitride particles as claimed in claim 1 in which the average particle size is about 100 microns.

3. Wurtzite nitride particles larger than 50 microns in diameter produced by subjecting recrystallized pyrolytic boron nitride to dynamic shock treatment at pressure and temperature in the stable region of the boron nitride phrase diagram for high density boron nitride.

4. The abrasive particles of claim 3 which are several hundred microns in diameter.

5. The abrasive particles of claim 3 in which the average particle size is about 100 microns.

6. Wurtzite boron nitride particles having a particle size of at least 50 microns.

7. The particles of claim 6, in which the particle size is several hundred microns in diameter.

8. The particles of claim 6, in which the average particle size is about 100 microns.

* * * * *